(12) United States Patent
Chen

(10) Patent No.: US 6,424,120 B1
(45) Date of Patent: Jul. 23, 2002

(54) ASYMMETRICAL CHARGER

(75) Inventor: Tonny Chen, Chang-Hua (TW)

(73) Assignee: E-Lead Electronic Co., Ltd. (TW)

( * ) Notice: Subject to any disclaimer, the term of this patent is extended or adjusted under 35 U.S.C. 154(b) by 0 days.

(21) Appl. No.: 09/987,067

(22) Filed: Nov. 13, 2001

(51) Int. Cl.[7] .............................................. H01M 10/46
(52) U.S. Cl. ..................................... 320/125; 320/160
(58) Field of Search ................................ 320/110, 112, 320/114, 116, 118, 125, 127, 128, 137, 160

(56) References Cited

U.S. PATENT DOCUMENTS

| | | | |
|---|---|---|---|
| 3,735,233 A | * | 5/1973 | Ringle |
| 5,391,972 A | * | 2/1995 | Gardner et al. |
| 5,410,237 A | * | 4/1995 | Sharrah et al. |
| 5,410,238 A | * | 4/1995 | Ishizuka et al. |
| 5,646,505 A | * | 7/1997 | Melnikov et al. |

* cited by examiner

Primary Examiner—Edward H. Tso
(74) Attorney, Agent, or Firm—Troxell Law Office PLLC

(57) ABSTRACT

An improved asymmetrical charger for charging a plurality of batteries of different capacity and voltage values, and automatically judging the residual power capacity and charge saturation level of every battery mainly includes a control unit, a voltage detection unit, a battery dock, an alternate power supply circuit, a current detection and rapid/slow charging switch unit, a battery detection unit, and a human machine interface. The battery dock is connected to a main circuit of the alternate power supply circuit, and connects in series at least one battery chamber which has two parallel circuits; one of the parallel circuits has a short circuit switch driven by the current detection and rapid/slow charging switch unit and another one of the parallel circuits has a positive conductor and a negative conductor to connect a battery thereby to provide a safe charger for charging batteries of different capacities without risking overcharge or undercharge of the batteries.

2 Claims, 2 Drawing Sheets

ASYMMETRICAL CHARGER

BACKGROUND OF THE INVENTION

1. Field of the Invention

The invention relates to an improved asymmetrical charger and particularly a charger that does not require even or multiple times numbers of batteries for charging or discharging without the constraint of battery numbers.

2. Description of the Prior Art

The growing population of personal electronic products has created a great demand for batteries. As a result, battery consumption and expense also increase significantly. It becomes a great burden to many consumers. Some producers have developed and introduced chargeable batteries and chargers that can be used repeatedly (such as a prior art disclosed in TAIWAN Pat. No. 264137). These products can help users to reduce battery consumption and expenses. Most battery chargers now available on the market adopt series circuit designs. And the charging batteries should be even number or every charging battery chamber should contain a battery. Such kind of design and construction has the following disadvantages:

1. Every charging battery has a different capacity. It could happen that the power of one battery is already exhausted while other batteries still have some power remained. Hence all the batteries have to be charged together even some of them still are not exhausted.
2. As every battery has different residual power, when charging the batteries, it will happen that one of them is fully charged while others are still not fully charged. Thus it will result in some batteries under charged or overcharged.

SUMMARY OF THE INVENTION

In view of aforesaid disadvantages, it is a primary object of the invention to provide an improved asymmetrical charger that allows a plurality of batteries charging simultaneously, regardless of different capacity, voltage or residual power of the batteries.

The charger of the invention mainly includes a control unit, a voltage detection unit, a battery dock, an alternate power supply circuit, a current detection and rapid/slow charging switch unit, a battery detection unit, and a human machine interface.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
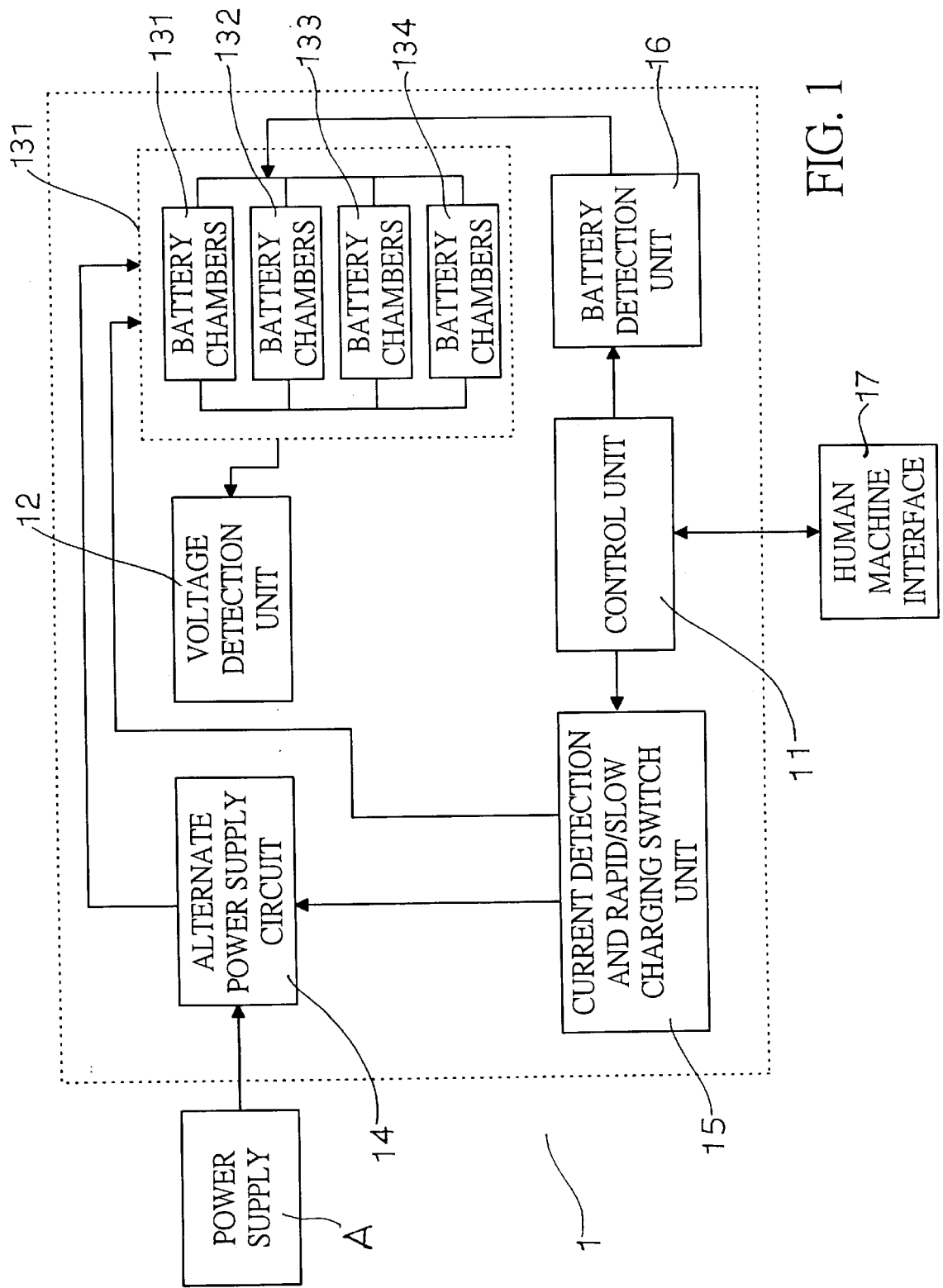
FIG. 1 is a system block diagram of the invention.

Referring to FIG. 1, the asymmetrical charger 1 of the invention mainly consists of a control unit 11, a voltage detection unit 12, a battery dock 13, an alternate power supply circuit 14, a current detection and rapid/slow charging switch unit 15, a battery detection unit 16, and a human machine interface 17.

The control unit 11 controls the operations of various units of the charger 1 and receives signals from the voltage detection unit 12, and depending on signal differences, outputs different control commands to various units.

The voltage detection unit 12 is controlled by the control unit 11 for detecting residual power of batteries B1, B2, B3, B4 held in the battery chambers 131, 132, 133, 134 of the battery dock 13, and transmits the detected information to the control unit 11.

Figure 2:
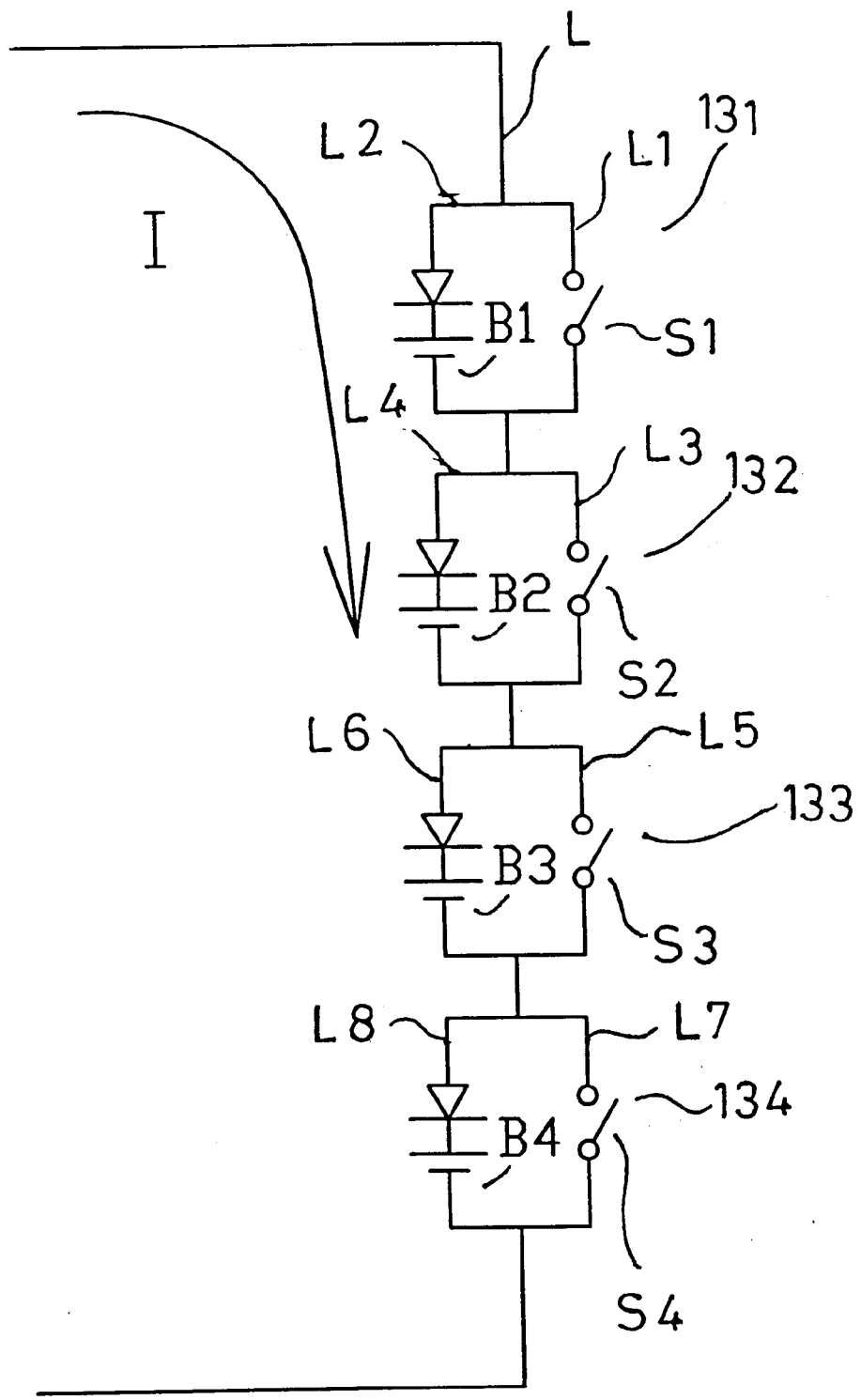
FIG. 2 is a schematic view of a circuit for battery chambers of the invention.

The battery dock 13 has at least one battery chamber 131, 132, 133, 134 (also referring to FIG. 2) for housing the batteries B1, B2, B3, B4 to allow the batteries B1, B2, B3, B4 charging or discharging (discharging circuits are known in the art and form no part of the invention, thus will be omitted here).

The alternate power supply circuit 14 is controlled by the current detection and rapid/slow charging switch unit 15 for converting input electric power (such as a general household electric power A) to an output at a charging voltage and current designated by the current detection and rapid/slow charging switch unit 15. The charging voltage and current may be set to different values for rapid charging and slow charging.

The current detection and rapid/slow charging switch unit 15 is controlled by the control unit 11 to switch the output voltage and current of the alternate power supply circuit 14 and to drive switches S1, S2, S3, S4 of the battery chambers 131, 132, 133, 134 to perform short circuit switching operation.

The battery detection unit 16 detects if there are charging batteries held in the battery chambers 131, 132, 133, 134 of the battery dock 13, and transfers feedback of the voltage and current information of the charging batteries to the control unit 11.

The human machine interface 17 provides users an interface to set or use the charger 1, and may be pushbuttons, switches and the like.

When in use, the battery dock 13 is connected to a main circuit L of the alternate power supply circuit 14, and connects in series at least one battery chamber 131, 132, 133, 134. Each of the battery chambers 131, 132, 133, 134 has two parallel circuits L1 and L2, L3 and L4, L5 and L6, L7 and L8. One circuit L1 (or L3, L5, L7) has a short circuit switch S1 (or S2, S3, S4) driven by the current detection and rapid/slow charging switch unit 15. Another circuit L2 (or L4, L6, L8) has a positive conductor and a negative conductor to connect the batteries B1, B2, B3, B4. By means of circuits set forth above, when a battery is fully charged and saturated, the voltage detection unit 12 transmits a fully loaded signal to the control unit 11 which orders the switch S1 (or S2, S3, S4) of the circuit L1 (or L3, L5, L7) to form a short circuit, and orders another circuit L2 (or L4, L6, L8) stop charging.

Through the foregoing technique, charging batteries of different voltages and currents can be charged concurrently. The operation processes include the following steps:

1. Users utilize the human machine interface 17 to activate the charger 1.
2. The battery detection unit 16 detects if the battery chambers 131, 132, 133, 134 having charging batteries housed therein.
3. If there is no charging battery, repeats the step 2; if the outcome is positive, detect if the human machine interface 17 is set for discharging function; if the outcome is positive, discharge the batteries housed in the battery chambers 131, 132, 133, 134 through discharging circuits until the residual power of the batteries are exhausted completely; if the human machine interface 17 is not being set for discharging function, branch to step 4.

4. The current detection and rapid/slow charging switch unit 15 detects if the human machine interface 17 is being selected for rapid charging or slow charging, than orders the alternate power supply circuit to output different voltage (or current) to the battery dock 13 to proceed charging.

5. The voltage detection unit 12 detects the capacity of batteries held in the battery chambers 131, 132, 133, 134. In case one battery chamber 131 (or 132, 133, 134 or the like) has reached a fully charged load, the voltage detection unit 12 will output a signal to the control unit 11 which will command the current detection and rapid/slow charging switch unit 15 to short circuit the switch S1 (or S2, S3, S4) in the battery chamber 131 (or 132, 133, 134) where the fully charged battery is housed so that the battery in the battery chamber 131 (or 132, 133, 134) will no longer be charged. Otherwise, branch to step 4 for the battery chambers where the not fully charged batteries are housed.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. An improved asymmetrical charger comprising a control unit, a voltage detection unit, a battery dock, an alternate power supply circuit, a current detection and rapid/slow charging switch unit, a battery detection unit, and a human machine interface, wherein:

the battery dock is connected to a main circuit of the alternate power supply circuit, and connects in series at least one battery chamber which has two parallel circuits, one of the parallel circuits has a short circuit switch driven by the current detection and rapid/slow charging switch unit and another one of the parallel circuits has a positive conductor and a negative conductor to connect a battery thereby to provide a safe charger for charging batteries of different capacities without risking overcharge or undercharge of the batteries.

2. The improved asymmetrical charger of claim 1, wherein the current detection and rapid/slow charging switch unit is controlled by the control unit to switch voltage and current values output by the alternate power supply circuit, and to drive the short circuit switch of the battery chamber to perform switching operation.

* * * * *